Patented July 14, 1942

2,290,113

UNITED STATES PATENT OFFICE 2,290,113

TITANIUM SOLUTION MANUFACTURE

L'Roche G. Bousquet, Baldwin, and Maxwell J. Brooks, New York, N. Y., assignors to General Chemical Company, New York, N. Y., a corporation of New York No Drawing. Application March 29, 1940, Serial No. 326,671

5 Claims. (Cl. 23—117)

This invention deals with manufacture of crystalloidal, relatively low acidity factor titanium sulfate solutions. More particularly, the invention is directed to methods for making, from titaniferous raw materials such as ilmenite, crystalloidal titanium sulfate solutions having within certain limits any desired low acidity factor, for example crystalloidal titanium sulfate solutions having acidity factors of around zero or if desired even substantially less than zero, i. e., a minus acidity factor.

As known in the art relating to production and use of titanium sulfate solutions, percent "acidity factor" or "factor of acidity" (represented by F. A.) of a titanium sulfate solution is the ratio (multiplied by 100) of the so-called free $H_2SO_4$ (i. e., acid not combined with bases or with titanium as $TiOSO_4$), and the titanium equivalent acid based on $TiOSO_4$, (i. e., the acid constituent of $TiOSO_4$ as such). Free acid plus acid combined with titanium to form $TiOSO_4$ as such is designated "active acid." In terminology of the art, zero F. A. represents a condition in which all titanium in solution is present as titanyl sulfate ($TiOSO_4$), and 100% F. A. represents a condition in which all titanium is present as normal tetravalent titanium disulfate, $Ti(SO_4)_2$. Similarly, titanium sulfate solution containing less acid than needed to combine with bases other than titanium and to form $TiOSO_4$ with the titanium present is designated as having minus acidity factor. For example, in a case where solution conditions are such that substantially all of the titanium has been precipitated out as hydrate, e. g., as a result of neutralization of all of the acid, F. A. of the mother liquor is about minus 100%.

The crystalloidal state of titanium sulfate solutions is characterized by absence of colloidal titanium compound. A satisfactory, sensitive test for absence of colloidal titanium is that which shows absence of coagulated titanium when a sample of the solution to be tested is treated with an equal volume of concentrated (35–37%) hydrochloric acid. In practice of this test, any colloidal titanium in the sample is coagulated immediately on addition of hydrochloric acid. Should colloidal titanium content of the sample be substantial, coagulated material though suspended and unsettled is readily visible. If no coagulated material is visible the hydrochloric acid treated sample may be settled for a substantial period of time, and filtered or centrifuged in a high-speed centrifuge. If analysis of the filtrate or of the centrifuged liquor shows the same total titanium (calculated as $TiO_2$) content by weight as did the sample prior to hydrochloric acid dilution, the sample tested contained no colloidal titanium. If analysis of the filtrate or the centrifuge liquor shows appreciably less total titanium than that of the sample prior to hydrochloric acid dilution, it will be evident the sample contained colloidal titanium in amount corresponding with the total titanium deficiency of the filtrate or centrifuge effluent subjected to analysis.

In practice, occasions arise in which it is desirable to have available crystalloidal titanium sulfate solutions of moderately low F. A. say 40–60%, or in the neighborhood of zero or below.

It is known that titanium sulfate solutions having F. A. of the order of say 35–30% or possibly lower can be made by direct sulfuric acid attack on titaniferous ores and leaching of the resulting mass with water. This procedure has two serious commercial disadvantages. First, in order to obtain low F. A. it is necessary to use such relatively small amount of sulfuric acid that titanium recovery from the ore is too low for commercial purposes. Second, solutions themselves produced in this way, while of relatively low F. A., almost invariably contain titanium in colloidal form with the result that, as known, such solutions are unstable on account of premature hydrolysis initiated by the presence of colloidal titanium.

Literature and patents describe production of solutions having low acidity factor. While F. A. may be low, such solutions are not crystalloidal because of presence of colloidal titanium compound. Further, it is known that acidity factor of stock high F. A., e. g. 55–90% titanium sulfate solution may be reduced by acid binding or neutralizing agents such as basic compounds. While possible by use of such materials to reduce F. A. of crystalloidal, high acid titanium sulfate solution, low F. A. solutions produced by previous prior art methods contain large amounts of titanium in colloidal form, and hence are noncrystalloidal and extremely unstable. In fact it is because of presence of colloidal titanium and resulting instability that solutions made by these prior neutralizing methods are said to be useful as seeding agents in hydrolytic precipitation of metatitanic acid from titanium sulfate solutions.

One of the principal objects of this invention is to provide for manufacture of crystalloidal low F. A. titanium sulfate solution by methods the first stage of which, involving attack of sulfuric acid on certain titaniferous raw materials, facilitates use of such an adequate amount of acid that commercially satisfactory titanium extraction from the raw material may be had. Another object is to provide for good recovery from the raw material of titanium in water soluble form. Optionally, products of the first stage are crystalloidal titanium sulfate solutions of fairly low F. A., and another objective is provision of methods for making these intermediate solutions without preliminary productions of high F. A. titanium sulfate solutions. It is another object of the invention to afford methods for further reducing acidity of such intermediate crystalloidal titanium sulfate solutions by procedure which avoids disturbing their crystalloidal characteristics and prevents formation of any colloidal titanium compound during such further acidity reduction. The invention also aims to provide methods for making crystalloidal titanium sulfate solutions of low F. A. by procedure in which operating precautions needed to prevent formation of colloidal titanium are simple and easily controlled.

The process of the invention may be briefly outlined as follows: In the first process stage of the present improvements, iron containing titaniferous raw material, such as ilmenite, having not less than about 40% of the total iron in the ferrous state, is digested with sulfuric acid to form an initial, solid, relatively high F. A. digest mass in which titanium and iron are principally in the form of water soluble sulfates. The mass is then heated or baked at higher temperatures controlled so as to substantially reduce acidity factor of the mass, but at the same time minimize conversion of titanium to water insoluble form. The product of this heating operation is a soft, frangible cake comprising chiefly relatively low F. A. titanium sulfate, ferric sulfate, and ferrous sulfate, most of which salts are in water soluble form. The mass is treated with water under conditions to avoid formation of any colloidal titanium compound and to form a solution containing the bulk of the titanium of the baked mass as water soluble titanium sulfate, and most of the iron as ferric sulfate. This intermediate solution, optionally constituting one of the products of the process of the invention, is a crystalloidal titanium sulfate solution of relatively low F. A. If desired to still further decrease acidity factor of such solution, according to the second stage of the invention process, the solution is then treated with certain hereinafter disclosed acid binding agents to lower the F. A. to the sought-for value.

Procedure we have discovered is such as to make it feasible to first secure satisfactory titanium extraction from titaniferous ores relatively high in ferrous iron by use of adequate amount of acid, maintain the bulk of the titanium in water soluble form, and to produce crystalloidal titanium sulfate solution of fairly low F. A. without preliminary formation of high F. A. solutions. Further, by using a relatively low F. A. solution of this nature, in accordance with the present improvements it is then possible to produce crystalloidal titanium sulfate solution having within certain limits any desired predetermined lower acidity factor. In practical commercial operations, for reasons not important here, it is often desirable to subject to hydrolysis a titanium sulfate solution (e. g. to precipitate crude metatitanic acid) having F. A. something less than the acidity factor of typical high F. A. titanium sulfate stock solutions. The present improvements thus make possible what may be considered as direct production of crystalloidal relatively low F. A. titanium sulfate solutions from certain titaniferous raw materials. The invention also affords satisfactory ways for making crystalloidal titanium sulfate solutions having any desirable low F. A., for example production of crystalloidal titanyl sulfate solution which, it will be understood, has F. A. of about zero.

In production of crystalloidal low F. A. titanium salt solutions, the feature of first importance is prevention of formation of any, even very small amounts of colloidal titanium compounds. Investigations show that once colloidal titanium is produced, if only in a highly localized zone of a solution undergoing treatment regardless of care with which the subsequent acidity reducing may be carried out, a satisfactory crystalloidal solution is not obtained, apparently because colloidal titanium once formed, although in very small amounts, initiates production of further colloidal titanium in quantity sufficient to prematurely hydrolyze the whole solution. Accordingly, the sought-for and accomplished objects of the invention are prevention of formation of colloidal titanium and simplicity of procedural steps from operating viewpoint.

In practice of the invention, the raw materials subjected to sulfuric acid digestion are iron containing titaniferous materials having not less than about 40% by weight of the total iron in ferrous condition. Thus, the invention is applicable to direct use of many types of ilmenite ores. As will appear from subsequent discussion, the ore-acid digest mass baking stage of the process involves acidity reduction by oxidation of ferrous sulfate to ferric, the degree of acidity reduction depending at least to some extent on the amount of ferrous sulfate in the mass subjected to baking. We have found that by using in the ore-acid digest operation, high ferrous iron titaniferous material of the kind stated, we are enabled to secure commercially feasible titanium extraction from the ore, and furthermore to effect conversion of most of the titanium to water soluble form. By so proceeding, there is formed an ore-acid digest mass having large amount of iron in the ferrous state. Should available titaniferous raw material have a high ferric iron content and contain less than 40% of the total iron in the ferrous form, the material may be subjected to a preliminary reducing operation, for example by heating in a reducing atmosphere or in the presence of carbon, to bring the ferrous iron content into the indicated range.

The quantity of sulfuric acid used to digest the titanium ore may be less than, equivalent to, or in excess of the amount theoretically required to convert titanium of the ore to the disulfate, but should not be less than that forming a digest mass having an F. A. above about 40% to guard against possible formation of colloidal titanium at a later stage of the process. In order to obtain most satisfactory ore decomposition and titanium yields in water soluble form, it is preferred to use $H_2SO_4$, which may be in the form of 78-98% sulfuric acid, in amount less than the equivalent needed to form the disulfate, i. e. less than that required to form a digest mass of F. A. less than 100%, and generally above that forming a digest mass having an F. A. above 50%.

Sulfuric acid and ore, preferably finely divided say 100 to 300 mesh, are charged into an open top digestion vat. Although initial reaction of ore and acid is largely exothermic it is preferred if necessary to apply extraneous heat to raise and maintain the mass at temperatures from about 150° C. to about 200° C. for say an hour. During this digestion of raw material of the type described, titanium oxides of the ore are converted to sulfates which for the most part are water soluble, and the resultant mass is in the form of a relatively soft cake.

The solid mass resulting from the initial ore-acid digest, having F. A. above 40%, is then subjected to a heating or baking operation, e. g. in an externally heated muffle furnace during which baking operation temperature is increased to 275–325° C. Purpose of baking is to effect acidity factor reduction, and to accomplish this without converting any titanium to colloidal condition and without converting substantial amount of titanium to water insoluble form. Acidity factor reduction involves lessening of the amount of acid radical associated with titanium. In the baking operation, acidity factor of the mass is reduced by eliminating some of the $SO_4$ as fumes, and also by oxidizing some ferrous sulfate to ferric sulfate thus increasing the amount of $SO_4$ tied to iron in the mass. Reactions effecting these changes take place at temperatures of the order of 275–325° C. To facilitate acidity reduction by baking, it will be seen the ferrous sulfate content of the digest mass should be as high as feasible. On baking, some $H_2SO_4$ is vaporized and driven off, and some $H_2SO_4$ probably effects oxidation of the ferrous sulfate to ferric with resultant formation of $SO_2$ and water vapor. Baking is carried on at temperatures high enough to drive off some or all of the free sulfuric acid, as desired, removal of free sulfuric acid being evidenced by evolution of sulfur containing fumes from the mass. Where no more visible fumes are given off by the cake, baking is preferably stopped, since beyond this point no material further decrease of F. A. is brought about, and prolonged heating tends toward conversion of water soluble titanium to water insoluble form. Ordinarily, baking time is about three hours. By using the previously indicated high ferrous iron content ore, relatively low ratio of acid to ore in the initial acid-ore digest, and relatively low temperatures in baking operation, we find conversion of titanium to water insoluble form may be minimized, and that there is no tendency toward formation of colloidal titanium when the baked mass is subsequently water treated to form titanium sulfate of fairly low F. A.

Digestion and baking have been described for convenience as a series of steps carried out at different temperatures. All of the heating may be considered more or less as a one-step operation carried out at temperatures increasing fairly gradually so as to afford reactions effected at certain temperatures sufficient time to proceed smoothly.

The baked mass is a dry cake comprising relatively low F. A., water soluble titanium sulfate, ferric sulfate, and more or less ferrous sulfate depending upon whether or not baking has been carried to a point sufficient to oxidize substantially all ferrous sulfate to ferric. Depending upon such factors as amount of acid used in the ore-acid digest, F. A. of the digest mass, and temperature and time of baking, the later operation may reduce F. A. of the digest mass from about 40 to upwards of 100% down to about 5 to 30%.

The baked cake is next dissolved in water to form a relatively low acid factor titanium sulfate solution, one of the products of the invention. The quantity of water used is ordinarily minimized to facilitate production of a solution of high titanium concentration (calculated as $TiO_2$), and as a rule varies from 1.2 to 1.75 parts by weight per part of the baked cake. Amount of water should not exceed that which at any subsequent stage of the process permits the $TiO_2$ concentration to fall below about 70 g. p. l., and preferably not below 100 g. p. l. During dissolution the mass may be agitated, and in about an hour or so most of the titanium will have gone into solution as titanium sulfate.

At the time of dissolution of the cake in water and during all subsequent steps of the process hereindisclosed, temperature control of the mass undergoing treatment becomes a feature of material importance. Temperatures are regulated to prevent formation of colloidal titanium compound. The following temperature conditions apply to all operations of the process of the invention including and subsequent to dissolution of the baked cake in water. Temperature of the mass undergoing treatment should be maintained not higher than about 60° C. To secure best results in reasonably large-scale work, and to minimize tendency toward formation of colloidal titanium temperatures should be held preferably below about 50° C. Minimum temperature is a matter of operating convenience. Should it be desired to crystallize out more or less reaction product, e. g. ferrous sulfate, temperature may be slightly above room temperature, e. g. 30–35° C., according to the degree of fluidity desired in the reacting mass. However, even substantially lower temperatures do not in any way affect colloidal character of the solutions made in accordance with the invention.

Generally, acidity factor of the solution thus made is the same as that of the baked cake, although in some situations F. A. of the solution may be a few percent higher than that of the cake on account of tendency of higher acidity factor constituents of the baked cake to go into solution more readily than those of lower F. A. The process of the invention as thus far described may be employed optionally to produce crystalloidal titanium sulfate solutions of acidity factor ranging from say 5 to 30%. If desired the solution resulting from baked cake water treatment operation may be filtered to remove any insoluble constituents carried to the process from the original titanium ore. We have found that by having regard for the operating conditions noted, it is possible to produce crystalloidal titanium sulfate solutions by the relatively simply controlled process described notwithstanding the fact that during the acidity reduction effected during the baking operation fairly high temperatures are employed.

In a situation where it is desired to further reduce acidity factor lower than that attainable by the baking operation, the fairly low F. A. solution formed by dissolution of the baked cake may be treated with certain acid binding materials. The acid binding materials employed in this second stage of the process of the invention are those in metallic form, above hydrogen in the electromotive series. Preferably, the metals used are those, such as iron, zinc, aluminum and magnesium, above hydrogen and below the alkali metals in the series.

Most of the iron sulfate of the product solution of the baking operation is in the ferric form and hence is readily reducible. The metallic material acidity reduction stage involves two phases. During the first, assuming use of metallic iron, practically all of the metallic iron is consumed in the reduction of the ferric sulfate to ferrous.

By what may be termed reaction (a), metallic iron reacts with $SO_4$ radical in the solution forming ferrous sulfate and liberating hydrogen. By a reaction (b), one portion of the latter reacts with ferric sulfate reducing the same to ferrous and forming sulfuric acid. By a reaction (c), the second portion of the hydrogen reacts with titanic sulfate forming titanous sulfate and sulfuric acid. Theoretically there is no acidity reduction since reactions (b) and (c) liberate as much $SO_4$ as is taken from the main solution as $FeSO_4$ by reaction (a). Practically, however, some of the hydrogen of reaction (a) escapes as gas with the result that as to the escaped hydrogen of reaction (a) there is no reaction of escaped hydrogen and ferric sulfate and titanic sulfate, and acidity of the mass is reduced to the extent of the $FeSO_4$ formed in production by reaction (a) of $FeSO_4$ and the hydrogen which escapes as gas. Accordingly, while during reduction of ferric iron to ferrous there is theoretically no acidity reduction, practically some further acidity reduction is effected. In this so-called first phase, reduction of the ferric iron to ferrous might be brought about by treating the product solution of the baking operation with any reducing agent such as hydrogen sulfide. However, a reducing agent of this type forms a certain amount of sulfuric acid the presence of which would increase rather than decrease the acidity factor of the solution, thus to some extent offsetting acidity reduction accomplished in the baking operation. Since the acidity reducing materials mentioned have the practical effect of further reducing rather than increasing acidity factor, it is preferred to use these materials in the first phase, i. e. to preliminarily reduce ferric iron to ferrous, as well as in the second phase of the second stage in which second phase the acidity factor is reduced to the desired ultimate low degree.

In the second phase of the metallic material treatment stage, addition of further metallic iron, after all of the iron sulfate in the solution has been reduced to ferrous state, continues lowering the acidity factor, the added iron combining with $SO_4$ radical of the mass, forming ferrous sulfate. The quantity of metallic iron used depends upon the degree of acidity reduction desired and may be determined by calculation or test run. Use of certain acid binding agents for acidity reduction present operating difficulties arising from their inherent tendency to cause what appears to be local "over-neutralization" with attendant formation of colloidal titanium compound. For this reason it is necessary to observe certain procedural precautions to prevent formation of colloidal titanium. The previously noted metallic acid binding agents employed in the second acidity reducing stage of this invention afford the substantial operating advantage that, because of their acidity reducing properties, aside from temperature regulation of the mass no manipulative precautions such as control of rate of addition of the acid binding agent, are required. This makes possible use of the simplest types of reaction vessel which need be equipped only with appropriate cooling coils and a suitable agitator.

During introduction of metallic iron beyond the point where ferric iron is reduced to ferrous the titanous sulfate content of the mass increases to some extent. Should presence of appreciable titanous sulfate in the ultimate product solution be undesirable, titanous sulfate may be reoxidized to titanic by treating the solution with an oxidizing agent in amount just sufficient to reoxidize only the titanous sulfate or with an agent not powerful enough to reoxidize iron should it be desired to retain the iron in the ferrous state. Blowing the product solution with air is a simple expedient by which this may be accomplished.

Selection of the metallic acid binding material to be used is more or less dependent upon the particular operation at hand and involves consideration of factors such as whether or not it is desired to avoid introduction into the solution of undesired reaction products, and also as to use to which the ultimate product solution is to be put. For example, if it is desired to avoid incorporating with the reaction mass compounds of another metal such as aluminum, obviously such metallic binding agent should not be employed. Further, should it be desired to subject the low F. A. product solution in the process of this invention to hydrolysis by heating to precipitate crude metatitanic acid for pigment manufacture, where it is desired to make a pigment not affected by color the metallic binding material should be such as to form non-hydrolyzable salt with the titanium salt present in the solution.

In the foregoing, dissolution of baked cake in water and treatment of the resulting liquor with metallic acidity reducing material have been described as more or less separate steps. Where at the beginning of an operation, it is decided to use metallic acid binding material, dissolution of the baked cake in water and treatment with metallic material may be carried out as a single operation.

The following examples are illustrative of practice of the invention:

EXAMPLE 1

Finely ground ilmenite ore (85% thru 325 mesh), about 58.5% of total iron being present as ferrous oxide, was mixed with 98% sulfuric acid in ratio of 1.45 parts of $H_2SO_4$ to one part of ore. The acid-ore mixture was preliminarily heated by means of extraneous heat until temperature of about 170° C. was attained, at which point reaction proceeded exothermically. During preliminary heating, the mass was agitated sufficiently to prevent any settling of solid particles. The digest mass was an olive green cake, about 85% of the titanium as $TiO_2$ being water soluble, and analyzed as indicated in column A of Table 1.

Table 1

|  | A | B | C |
|---|---|---|---|
| $TTiO_2$ | 18.5% | 20.4% | 167 g. p. l. |
| $RTiO_2$ | Absent | | 11.1 |
| TFe | 10.9 | 10.4 | 86.5 |
| $TH_2SO_4$ | 56.3 | 53.3 | 354 |
| $AH_2SO_4$ | 23 | 28.4 | 202 |
| $FH_2SO_4$ | 10.4 | 3.4 | Minus 2 |
| Residue | 5.9 | 5.1 | |
| Percent F. A. | 45.6 | 13.9 | Minus .99 |
| Ratio $AH_2SO_4/TiO_2$ | 1.78 | 1.4 | 1.21 |
| Percent soluble $TiO_2$ | 84.2 | 87.2 | |
| Sp. gr. at 30° C | | | 1.48 |
| Distribution of Fe: | | | |
| Percent Fe (ferric) | 41.5 | 72.8 | 0.0 |
| Percent Fe (ferrous) | 58.5 | 27.2 | 100.0 |

In the table, $TTiO_2$ represents total titanium concentration calculated as $TiO_2$, $RTiO_2$ represents reduced titanium sulfate (titanous sulfate), $TH_2SO_4$ represents total $H_2SO_4$, $FH_2SO_4$ represents free $H_2SO_4$, $AH_2SO_4$ represents active $H_2SO_4$, and % F. A. represents factor of acidity.

The dry digest mass was baked in a muffle furnace for 3½ hours at temperature of about 288° C. The cake lost 10.7% by weight, and a large portion of the ferrous iron was oxidized to ferric. The baked cake analyzed as in column B.

In this specific operation no attempt was made to produce from the baked cake a crystalloidal solution by treatment of the same with water alone. Had the cake been treated with water only as previously described, the titanium sulfate solution thus obtained would have had an F. A. of about 13-15%. In the procedure of this particular example, it was desired to reduce acidity factor below that obtained by the baking operation, and accordingly the baked cake was treated with water and metallic iron in one operation. The quantity of metallic iron used was that calculated to form a final product having an F. A. of approximately zero, and the amount of metallic iron used above that necessary to reduce ferric iron to ferrous was about 60.5% of the total metallic iron. During treatment of the baked cake with water and metallic iron, the mass was agitated and temperature was kept between 50-60° C. The treated mass was further cooled to crystallize out some of the ferrous sulfate (as $FeSO_4.7H_2O$) and after clarification and centrifuging, analyzed as in column C of Table 1.

EXAMPLE 2

In this example, procedure up to addition of metallic iron was the same as in Example 1, and the digest and baked cakes analyzed as in columns A and B of Table 1. After grinding, the baked material was treated with water and metallic iron in one operation, the quantity of metallic iron used was that to form a final product having F. A. of zero, and the amount of metallic iron used above that necessary to reduce ferric iron to ferrous was about 61.5% of the total metallic iron. During treatment of the baked cake with water and metallic iron, the mass was agitated and temperature was kept between 40 and 60° C. After clarification and centrifuging, the product solution analyzed as shown in following Table 2:

Table 2

| | |
|---|---|
| $TTiO_2$ | 178 g. p. l. |
| $RTiO_2$ | 12.1. |
| TFe | 84.9. |
| $TH_2SO_4$ | 367. |
| $AH_2SO_4$ | 218. |
| $FH_2SO_4$ | None. |
| Per cent F. A. | Zero. |
| Ratio $AH_2SO_4/TiO_2$ | 1.23. |
| Per cent Fe (ferric) | 0.0. |
| Per cent Fe (ferrous) | 100.0. |

The herein prescribed HCl coagulation test showed the above product solutions were crystalloidal.

By operations similar to those detailed above, crystalloidal solutions of other acidity factors may be made. For instance, a solution of say 20% F. A., may be produced by following the procedure of Example 1 and modifying the same to suitably shorten the baking time, and then dissolving the cake in water, and filtering out any solid residue. Further, by appropriately increasing the amount of metallic iron used in Example 1, a solution having an F. A. of say minus 15% may be made. Ordinarily, it is not preferred to use the process of the invention to produce solutions having F. A. lower than about minus 35%.

We claim:

1. The method for making a crystalloidal titanium sulfate solution which comprises digesting titanium-iron ore, not less than 40% of the iron of which is in the ferrous condition, at elevated temperatures not higher than the order of 200° C. with sulfuric acid in amount sufficient to form a titanium sulfate digest mass having an acidity factor above 40%, baking the resultant digest mass with extraneous heat at temperatures of 275-325° C. for a time interval at least as long as the initial digesting and to effect evolution of visible fumes comprising sulfur compound whereby to reduce the $SO_4$ radical content of the said mass subjected to baking and to form a solid cake having the titanium thereof predominantly as water-soluble titanium sulfate and having an acidity factor lower and a ferric iron content higher than said digest mass, and treating the cake at temperature not above 60° C. with water in amount sufficient to dissolve the water soluble titanium sulfate content of said cake.

2. The method for making a crystalloidal titanium sulfate solution which comprises digesting titanium-iron ore not less than 40% of the iron of which is in the ferrous condition, at elevated temperatures not higher than the order of 200° C. with sulfuric acid in amount sufficient to form a titanium sulfate digest mass having an acidity factor above 40% and less than 100%, baking the resultant digest mass with extraneous heat at temperatures of 275-325° C. for a time interval at least as long as the initial digesting and to effect evolution of visible fumes comprising sulfur compound whereby to reduce the $SO_4$ radical content of the said mass subjected to baking and to form a solid cake having the titanium thereof predominantly as water soluble titanium sulfate and having an acidity factor lower and a ferric iron content higher than said digest mass, and treating the cake at temperature not above 60° C. with water in amount sufficient to dissolve the water soluble titanium sulfate content of said cake.

3. The method for making a crystalloidal titanium sulfate solution which comprises digesting titanium-iron ore, not less than 40% of the iron of which is in the ferrous condition at elevated temperatures not higher than the order of 200° C., with sulfuric acid in amount sufficient to form a titanium sulfate digest mass having an acidity factor above 40%, baking the resultant digest mass with extraneous heat at temperatures of 275-325° C. for a time interval at least as long as the initial digesting and to effect evolution of visible fumes comprising sulfur compound and until such evolution substantially ceases, whereby to reduce the $SO_4$ radical content of the said mass subjected to baking and to form a solid cake having the titanium thereof predominantly as water soluble titanium sulfate and having an acidity factor lower and a ferric iron content higher than said digest mass, and treating the cake at temperature not above 60° C. with water in amount sufficient to dissolve the water soluble titanium sulfate content of said cake.

4. The method for making a crystalloidal titanium sulfate solution of predetermined acidity factor which comprises digesting titanium-iron ore, not less than 40% of the iron of which is in the ferrous condition, at elevated temperatures not higher than the order of 200° C. with sulfuric acid in amount sufficient to form a titanium sulfate digest mass having an acidity factor above 40% and substantially above said predetermined factor, baking the resultant digest mass with extraneous heat at temperatures of 275–325° C. for a time interval at least as long as the initial digesting and to effect evolution of visible fumes comprising sulfur compound whereby to reduce the $SO_4$ radical content of the said mass subjected to baking and to form a solid cake having the titanium thereof predominantly as water soluble titanium sulfate and having an acidity factor lower and a ferric iron content higher than said digest mass, treating the baked cake at temperature not above 60° C. (1) with water in amount sufficient to dissolve the water soluble titanium sulfate content of said cake and (2) with material in metallic form, above hydrogen and below alkali metals in the electromotive series, in amount sufficient to reduce ferric iron of the resulting solution to ferrous and to lower the acidity factor to below that of said baked cake and to said predetermined degree.

5. The method for making a crystalloidal titanium sulfate solution of predetermined acidity factor which comprises digesting titanium-iron ore, not less than 40% of the iron of which is in the ferrous condition, at elevated temperatures not higher than the order of 200° C. with sulfuric acid in amount sufficient to form a titanium sulfate digest mass having an acidity factor above 40% and substantially above said predetermined factor and less than 100%, baking the resultant digest mass with extraneous heat at temperatures of 275–325° C. for a time interval at least as long as the initial digesting and to effect evolution of visible fumes comprising sulfur compound and until such evolution substantially ceases, whereby to reduce the $SO_4$ radical content of the said mass subjected to baking and to form a solid cake having the titanium thereof predominantly as water soluble titanium sulfate and having an acidity factor lower and a ferric iron content higher than said digest mass, treating the baked cake at temperature not above 60° C. (1) with water in amount sufficient to dissolve the water soluble titanium sulfate content of said cake and (2) with material in metallic form, above hydrogen and below alkali metals in the electromotive series, in amount sufficient to reduce ferric iron of the resulting solution to ferrous and to lower the acidity factor to below that of said baked cake and to said predetermined degree.

L'ROCHE G. BOUSQUET.
MAXWELL J. BROOKS.